(12) United States Patent
Chang

(10) Patent No.: US 9,228,377 B1
(45) Date of Patent: Jan. 5, 2016

(54) BICYCLE LOCK FOR MULTIPLE CONNECTION USES

(71) Applicant: Vulcan Sports Co., Ltd., Changhua (TW)

(72) Inventor: Chin Shu Chang, Changhua (TW)

(73) Assignee: VULCAN SPORTS CO., LTD., Changhua (TW)

( * ) Notice: Subject to any disclaimer, the term of this patent is extended or adjusted under 35 U.S.C. 154(b) by 0 days.

(21) Appl. No.: 14/601,149

(22) Filed: Jan. 20, 2015

(51) Int. Cl.
*B62H 5/00* (2006.01)
*E05B 71/00* (2006.01)
*B62H 5/14* (2006.01)
*E05B 65/00* (2006.01)
*E05B 29/00* (2006.01)

(52) U.S. Cl.
CPC . *E05B 71/00* (2013.01); *B62H 5/00* (2013.01); *B62H 5/14* (2013.01); *E05B 29/00* (2013.01); *E05B 65/00* (2013.01)

(58) Field of Classification Search
CPC ......... E05B 71/00; E05B 65/00; E05B 29/00; B62H 5/00; B62H 5/14
USPC ...................... 70/233, 234, 49, 30, 53, 52, 31
See application file for complete search history.

(56) References Cited

U.S. PATENT DOCUMENTS

| | | | | |
|---|---|---|---|---|
| 4,028,916 A * | 6/1977 | Pender | B62H 5/003 70/15 |
| 4,068,504 A * | 1/1978 | Pickard | E05B 71/00 70/14 |
| 4,112,720 A * | 9/1978 | Green | B62H 5/003 70/233 |
| 4,405,161 A * | 9/1983 | Young | E21B 33/03 137/382 |
| 4,426,861 A * | 1/1984 | Chillis | B62L 3/06 70/203 |
| 4,951,487 A * | 8/1990 | Dennis | B62H 5/001 280/304.3 |
| 5,005,390 A * | 4/1991 | Giannini | B60R 9/10 70/202 |
| 5,027,628 A * | 7/1991 | De Rocher | B62H 5/001 70/225 |
| 5,337,587 A * | 8/1994 | Davidson | B62H 5/001 280/279 |
| 5,491,992 A * | 2/1996 | Mandall | B60D 1/60 70/14 |
| 5,511,399 A * | 4/1996 | Lynn | B62H 5/08 180/219 |
| 5,709,113 A * | 1/1998 | Godfrey | B62H 5/00 70/227 |
| 5,718,134 A * | 2/1998 | Chang | B62H 5/003 70/18 |
| 5,873,271 A * | 2/1999 | Smith | B60D 1/60 280/507 |
| 5,889,463 A * | 3/1999 | Judd | B60R 25/1001 340/425.5 |
| 6,167,735 B1 * | 1/2001 | Brown | B60R 9/048 211/5 |
| 6,425,509 B1 * | 7/2002 | Dean | B60R 9/048 211/20 |
| 6,601,712 B2 * | 8/2003 | Dean | B60R 9/048 211/17 |
| 6,948,878 B1 * | 9/2005 | Smith, Jr. | F16B 2/185 403/110 |
| RE38,873 E * | 11/2005 | Denby | B62K 25/02 70/201 |
| 7,076,978 B2 * | 7/2006 | Denby | B62H 5/00 70/201 |
| 7,661,280 B1 * | 2/2010 | Weyland | B62H 5/003 224/425 |
| 8,083,112 B2 * | 12/2011 | Kuo | B62H 5/00 224/425 |
| 8,176,759 B2 * | 5/2012 | Katz | B62H 5/18 70/14 |
| 8,202,017 B2 * | 6/2012 | Shalaby | B62K 27/12 24/270 |

(Continued)

*Primary Examiner* — Suzanne Barrett
*Assistant Examiner* — Morgan McClure
(74) *Attorney, Agent, or Firm* — Guice Patents PLLC

(57) ABSTRACT

The invention relates to a bicycle lock for multiple connection uses, which is consisted of a body, a fit seat, a push rod, a lock cylinder module, a first clamping block, a second clamping block, a external locking element and an external connecting element. By the composition of the above structure, a quick release handle connected to a seat tube of a bicycle may be locked, and also, lock of connecting the external locking element and the external connecting element may be provided, to thereby achieve the purpose of preventing theft from a bicycle seat, front and rear wheels or other objects within a bicycle, and the purpose of conveniently locking and unlocking.

9 Claims, 9 Drawing Sheets

(56) References Cited

U.S. PATENT DOCUMENTS

| | | | | |
|---|---|---|---|---|
| 8,839,772 B2* | 9/2014 | Lee | ........................ | F41B 5/066 124/86 |
| 9,102,376 B1* | 8/2015 | Chang | .................... | B62H 5/145 |
| 2005/0044910 A1* | 3/2005 | Sloan | ...................... | E05B 37/00 70/446 |
| 2006/0130541 A1* | 6/2006 | Tollefson | ................ | B60D 1/60 70/49 |
| 2007/0101779 A1* | 5/2007 | Muerza | ................ | B62H 5/001 70/233 |
| 2008/0022734 A1* | 1/2008 | McDaid | ................... | B62H 5/00 70/233 |
| 2008/0022735 A1* | 1/2008 | Hood | ....................... | B62H 5/14 70/233 |
| 2012/0131966 A1* | 5/2012 | Yuan | ...................... | B62H 5/003 70/233 |
| 2012/0312058 A1* | 12/2012 | Mendyk | ................ | B62H 5/006 70/233 |
| 2014/0305175 A1* | 10/2014 | Irwin | ...................... | F41C 33/06 70/14 |

* cited by examiner

BICYCLE LOCK FOR MULTIPLE CONNECTION USES

BACKGROUND OF THE INVENTION a) Field of the Invention

The invention relates to a bicycle lock for multiple connection uses and, more particularly, a bicycle lock for a bicycle seat quick release handle connected locking external objects, to thereby achieve the purpose of preventing theft from a bicycle seat, front and rear wheels or other objects within a bicycle, and the purpose of conveniently locking and unlocking.

b) Description of the Prior Art

In order to conveniently adjust seat height of bicycles, replace and repair of front and rear wheels, a quick release handle may be used as a connecting component connected to the part connected to a frame, to thereby perform assembling and replacing operation conveniently. Although the quick release handles bring great convenience, some new problems are caused. Namely, when a bicycle is stopped outside, a thief may quickly remove a seat and front and rear wheels from bicycle frame by easily loosing the quick release handle. In order to prevent bicycle objects theft, owners buy bicycle locks used as security facilities of the bicycle objects.

However, the problem is that various bicycle locks sold in the market are mostly provided for locking the whole bicycle. Wherein front and rear wheels, the purpose of locking to prevent theft may be achieve through wearing a cable. But there is no space for a cable to wear around the seat, so that some owner removes the seat by using the quick release connection of the quick release handle when stopping, and carries it with him, so it is really inconvenient. For this reason, the industry develops a so-called quick release lock, wherein a lock is added in a quick release handle directly to fasten the seat. However, the structure of this kind of quick release lock is only for preventing theft of the seat, no for other bicycle objects, such as front and rear wheels and the whole bicycle. Therefore, for the purpose of preventing theft, at least one lock should be added, so that it is very troublesome to lock, the cost of buying locks is increased, and it is also troublesome for riders to put so many locks during riding.

SUMMARY OF THE INVENTION

In view of this, the inventor finally completes the bicycle lock for multiple connection uses of the present invention after numerous improvements, namely, the object of the present invention is to provide a bicycle lock for a bicycle seat quick release handle connected locking external objects, to thereby achieve the purpose of preventing theft from a bicycle seat, front and rear wheels or other objects within a bicycle, and the purpose of conveniently locking and unlocking.

To achieve the above object according to the invention, the bicycle lock for multiple connection uses of the present invention, which includes at least a body, a fit seat, a push rod, a lock cylinder module, a first clamping block, an external locking element, wherein:

the body, which is consisted of an upper housing and a lower housing, a first inserting hole and a second inserting hole are respectively set on an inner side of the body, a latch inserting hole is set on an outer side of the body, and a push rod groove, a lock cylinder groove, a second groove and a hold down groove are set inside the body;

the fit seat, which is correspondingly locked to the body, a first side arm and a second side arm are respectively set on two sides of the fit seat, a first side bolt is extended from the first side arm for inserting the first inserting hole, a first engaging teeth set is set on the first side bolt, a second side bolt is extended from the second side arm for inserting the second inserting hole, a second engaging teeth set is set on the second side bolt;

the push rod, which is placed inside the push rod groove, a pressing portion is set on a side of the push rod, a first inner teeth set is set on an inner side of the pressing portion for engaging with the first engaging teeth set, a first notch and a first spring retention groove are set in a middle section of the push rod, the first spring retention groove is provided for placing a first spring inside, a second inner teeth set is set on another side of the push rod for engaging with the second engaging teeth set;

the lock cylinder module, which is placed inside the lock cylinder groove, the cylinder module includes a lock cylinder and a drive rod, a key inserting hole is set on a side of the lock cylinder, a lock bolt is set on a front end of the lock cylinder, a fit groove is set on a rear end of the drive rod for fitting with the lock bolt, a second eccentric column is set on a front end of the drive rod, a side boss is set near side of the second eccentric column, the side boss is provided to be wedged into the first notch correspondingly;

the first clamping block, which is placed in the second groove, a second spring retention groove is set on a front side of the first clamping block, a second spring is placed in the second spring retention groove, a second ball limit slot is set on side of the first clamping block for clamping an entered second ball, a second notch is set on a rear side of the first clamping block for limiting the second eccentric column of the drive rod;

the external locking element, a fixed head is fixed on the body, the fixed head is connected to an end of a flexible body, a latch is connected to another end of the flexible body for inserting into the latch inserting hole of the body.

The above latch inserting hole, a pushing block is placed inside, a fourth spring retention groove is set on an inner side of the pushing block for placing a fourth spring to push.

The above upper housing, wherein a first limiting hole edge is set on an inner side of the upper housing, a second limiting hole edge is set on an inner side of the fit sear, a limiting hole is formed by combining the second limiting hole edge and the first limiting hole edge.

The above upper housing, a connecting portion is set on its outer side, two clamping slots are respectively set on two sides of the connecting portion, for a wedging portion of an external connecting element correspondingly wedged into the clamping slot.

The bicycle lock for multiple connection uses of the present invention, which includes at least a body, a fit seat, a push rod, a lock cylinder module, a first clamping block, a second clamping block, an external locking element and an external connecting element, wherein:

the body, which is consisted of an upper housing and a lower housing, a first inserting hole and a second inserting hole are respectively set on an inner side of the body, a latch inserting hole is set on an outer side of the body, a connecting portion is set on an outer side of the upper housing, and a push rod groove, a lock cylinder groove, a first groove, a second groove and a hold down groove are set inside the body;

the fit seat, which is correspondingly locked to the body, a first side arm and a second side arm are respectively set on two sides of the fit seat, a first side bolt is extended from the first side arm for inserting the first inserting hole, a first engaging teeth set is set on the first side bolt, a second side bolt is extended from the second side arm for inserting the second inserting hole, a second engaging teeth set is set on the second side bolt;

the push rod, which is placed inside the push rod groove, a pressing portion is set on a side of the push rod, a first inner teeth set is set on an inner side of the pressing portion for engaging with the first engaging teeth set, a first notch and a first spring retention groove are set in a middle section of the push rod, the first spring retention groove is provided for placing a first spring inside, a second inner teeth set is set on another side of the push rod for engaging with the second engaging teeth set;

the lock cylinder module, which is placed inside the lock cylinder groove, the cylinder module includes a lock cylinder and a drive rod, a key inserting hole is set on a side of the lock cylinder, a lock bolt is set on a front end of the lock cylinder, a fit groove is set on a rear end of the drive rod for fitting with the lock bolt, a first eccentric column is set in a middle section of the drive rod, a second eccentric column is set on a front end of the drive rod, a side boss is set near side of the second eccentric column, the side boss is provided to be wedged into the first notch correspondingly;

the first clamping block, which is placed in the second groove, a second spring retention groove is set on a front side of the first clamping block, a second spring is placed in the second spring retention groove, a second ball limit slot is set on side of the first clamping block for clamping an entered second ball, a second notch is set on a rear side of the first clamping block for limiting the second eccentric column of the drive rod;

the second clamping block, which is placed inside the first groove, a third spring retention groove is set on a front side of the second clamping block, a third spring is placed in the third spring retention groove, two first ball limit slots are set on a top of the second clamping block for clamping the entered first balls, a third notch is set on a rear side of the second clamping block for limiting the first eccentric column of the drive rod;

the external locking element, a fixed head is fixed on the body, the fixed head is connected to an end of a flexible body, a latch is connected to another end of the flexible body for inserting into the latch inserting hole of the body;

the external connecting element, which is correspondingly connected to the connecting portion of the body.

DETAILED DESCRIPTION OF THE INVENTION

Figure 1:
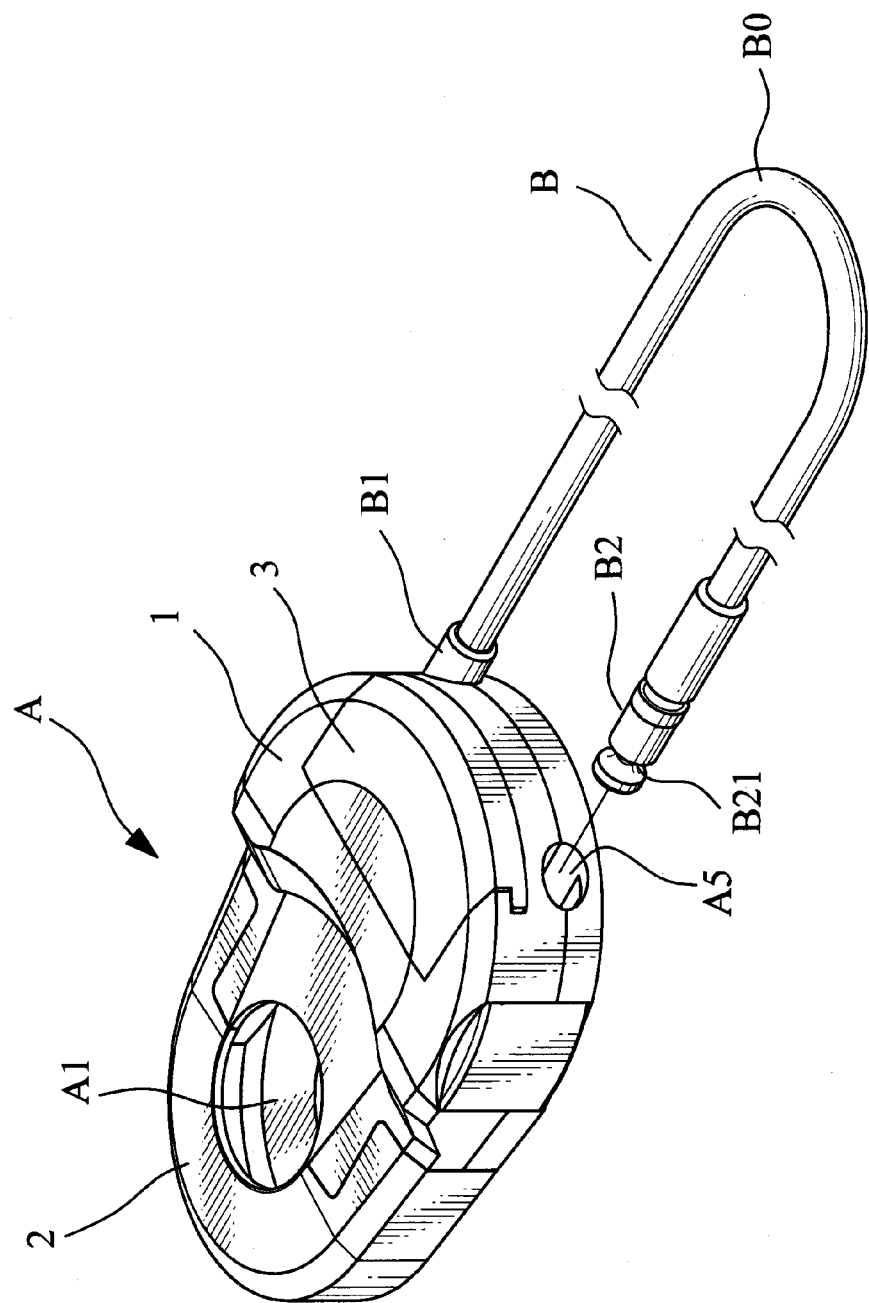
FIG. 1 is a three-dimensional schematic diagram of the present invention.
Figure 2:
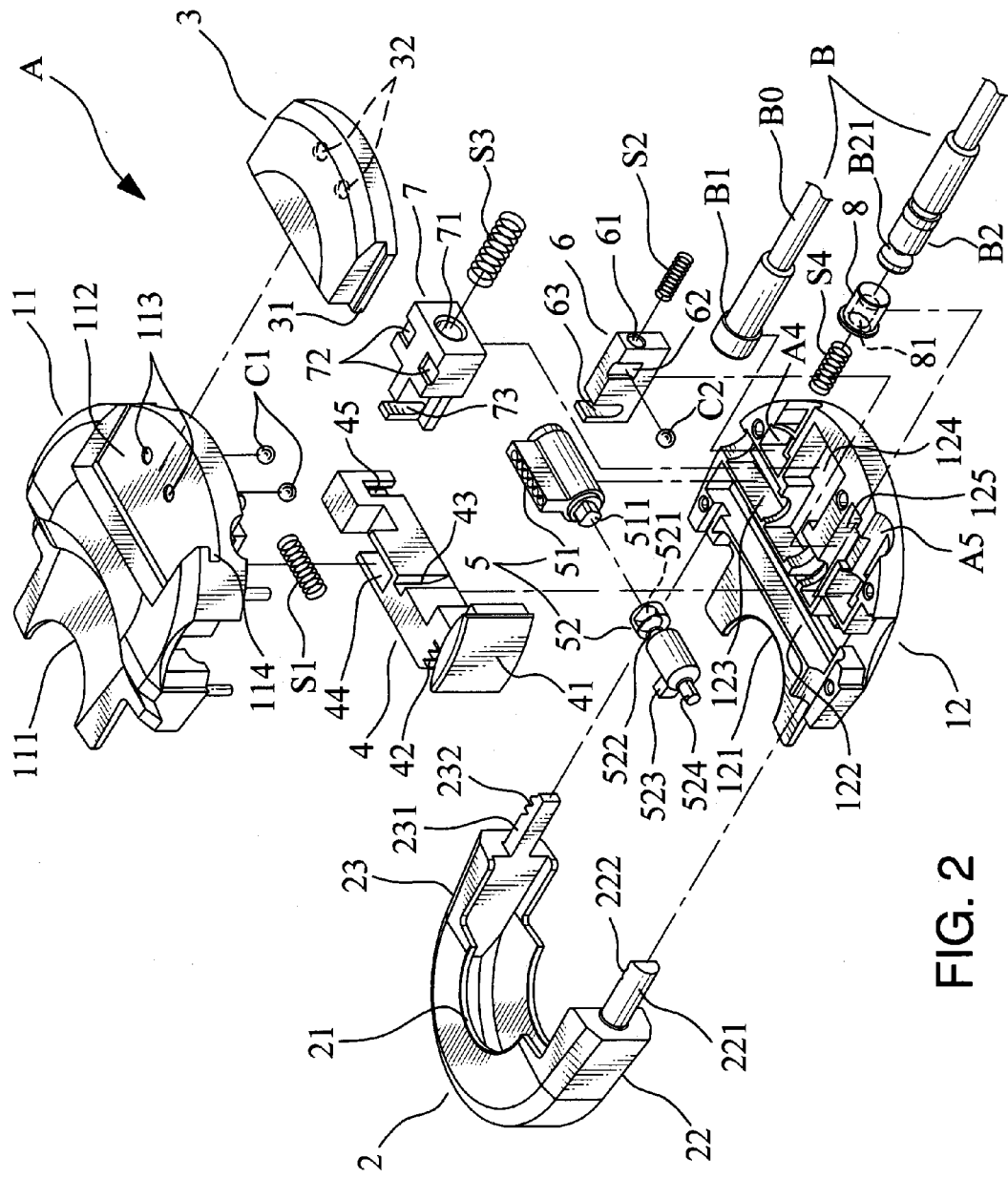
FIG. 2 is a three-dimensional exploded diagram of the present invention.
Figure 3:
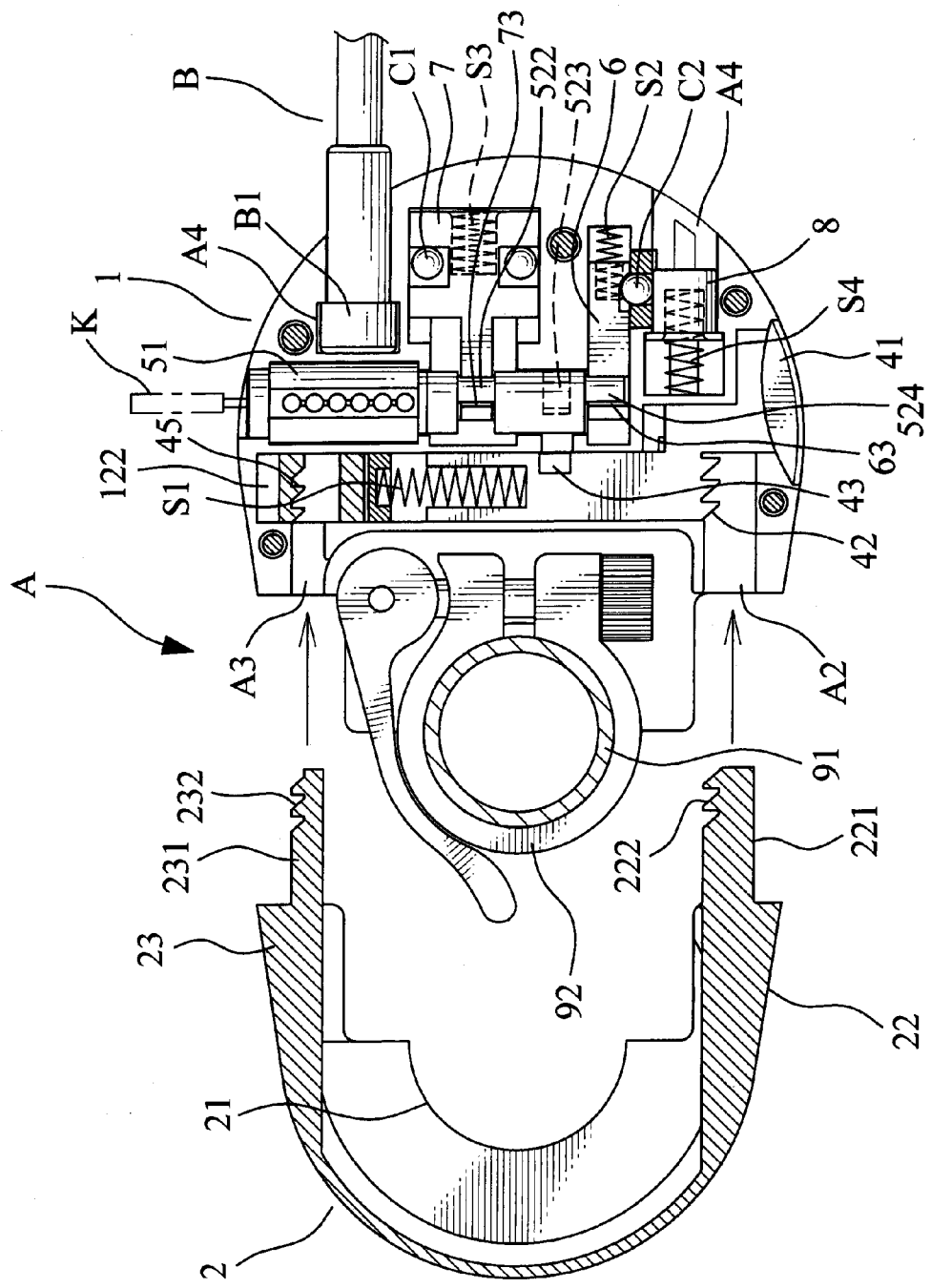
FIG. 3 is a schematic diagram of locking operation of the present invention.
Figure 4:
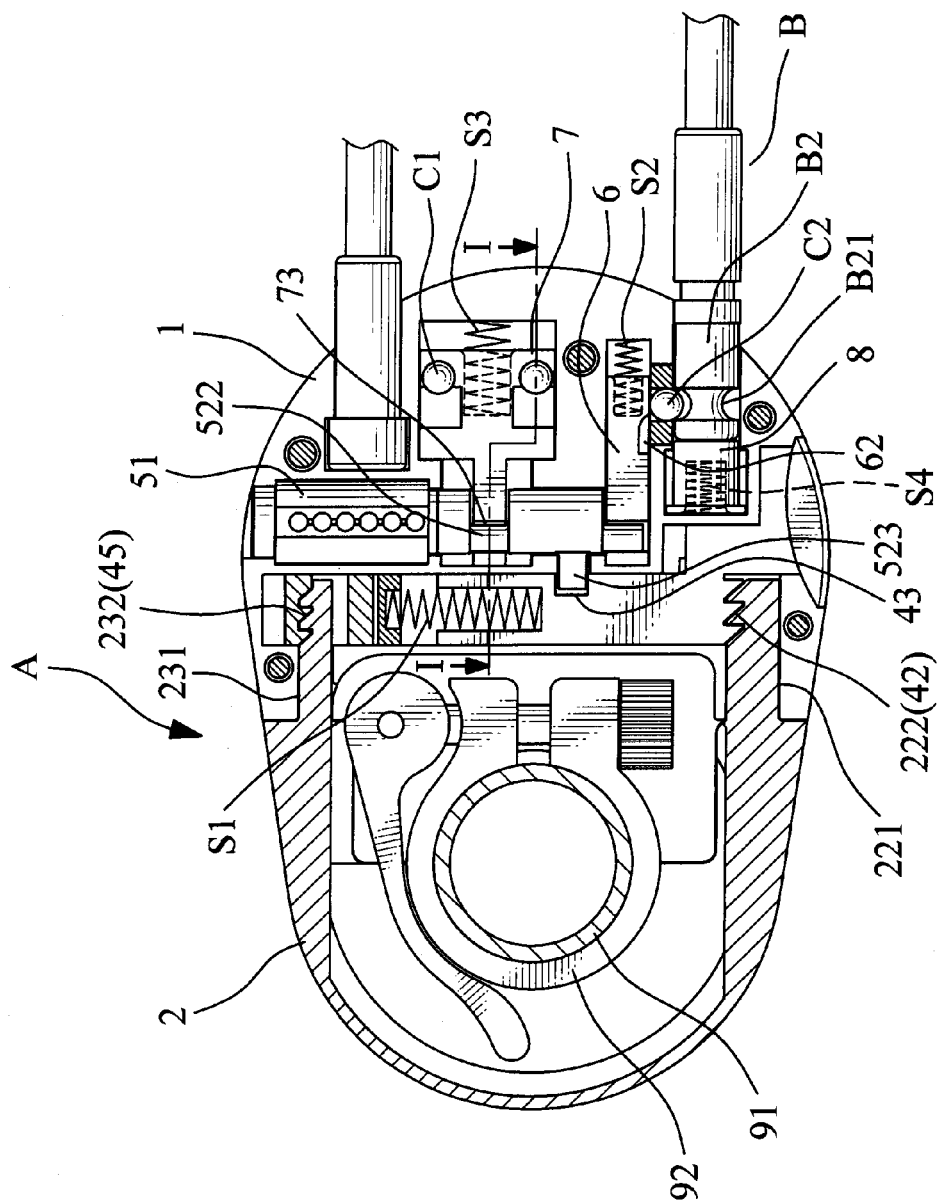
FIG. 4 is a schematic diagram of lock mode of the present invention.
Figure 6:
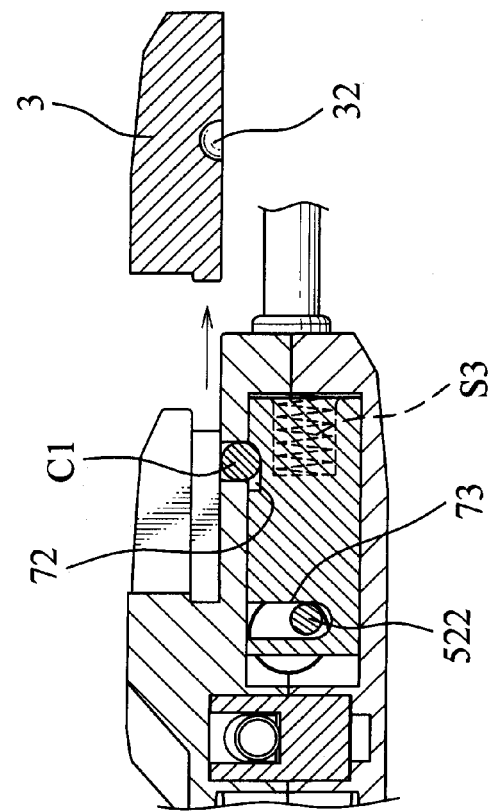
FIG. 6 is a schematic diagram of unlocking operation of the present invention with the external connecting element.
Figure 5:
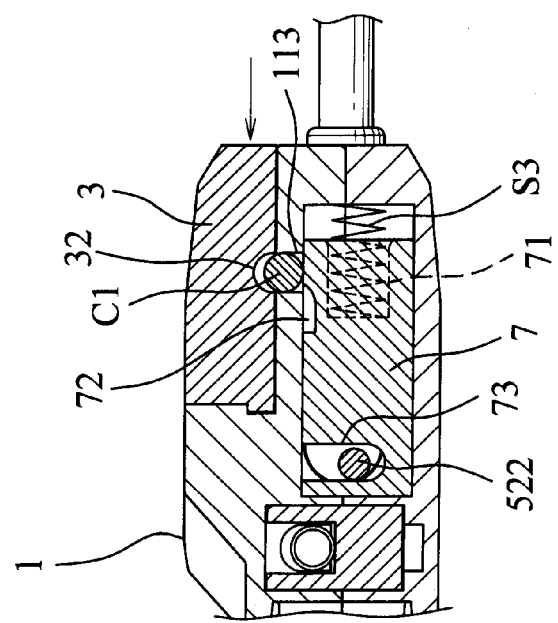
FIG. 5 is a I-I cross-sectional schematic diagram of FIG. 4 of the present invention.

Please refer to FIG. 1 to FIG. 5, a bicycle lock A for multiple connection uses of the present invention is consisted of a body 1, a fit seat 2, a push rod 4, a lock cylinder module 5, a first clamping block 6, a second clamping block 7, an external locking element B and an external connecting element.

The body 1, which is consisted of an upper housing 11 and a lower housing 12, a first inserting hole A2 and a second inserting hole A3 are respectively set on an inner side of the body 1, a latch inserting hole A5 is set on an outer side of the body 1, a pushing block 8 is placed inside the latch inserting hole A4, a fourth spring retention groove 81 is set on an inner side of the pushing block 8 for placing a fourth spring S4 to push, a first limiting hole edge 111 is set on an inner side of the upper housing 11, a connecting portion 112 is set on an outer side of the upper housing 11, two through holes 113 are set on the connecting portion 112 for two corresponding first balls C1 entering to clamp the external connecting element 3, two clamping slots 114 are respectively set on two sides of the connecting portion 112, a lower limiting hole edge 121 is set on an inner side of the lower housing 12, and a push rod groove 122, a lock cylinder groove 123, a first groove 124, a second groove 125 and a hold down groove A4 are set inside the body 1.

The fit seat 2, which is correspondingly locked to the body 1, a second limiting hole edge 21 is set on an inner side of the fit seat 2, a limiting hole A1 is formed by combining the second limiting hole edge 21 and the first limiting hole edge 111 of the body 1, a first side arm 22 and a second side arm 23 are respectively set on two sides of the fit seat 2, a first side bolt 221 is extended from the first side arm 22 for inserting the first inserting hole A2, a first engaging teeth set 222 is set on the first side bolt 221, a second side bolt 231 is extended from the second side arm 23 for inserting the second inserting hole A3, a second engaging teeth set 232 is set on the second side bolt 231.

The push rod 4, which is placed inside the push rod groove 122, a pressing portion 41 is set on a side of the push rod 4, a first inner teeth set 42 is set on an inner side of the pressing portion 41 for engaging with the first engaging teeth set 222, a first notch 43 and a first spring retention groove 44 are set in a middle section of the push rod 4, the first spring retention groove 44 is provided for placing a first spring S1 inside, a second inner teeth set 45 is set on another side of the push rod 4 for engaging with the second engaging teeth set 232.

The lock cylinder module 5, which is placed inside the lock cylinder groove 123 of the body 1, the cylinder module 5 includes a lock cylinder 51 and a drive rod 52, a key inserting hole (not shown in figure) is set on a side of the lock cylinder 51 (structure of the lock cylinder 51 is prior art, not describe in details here), a lock bolt 511 is set on a front end of the lock cylinder 51, a fit groove 521 is set on a rear end of the drive rod 52 for fitting with the lock bolt 511, a first eccentric column 522 is set in a middle section of the drive rod 52, a second eccentric column 524 is set on a front end of the drive rod 52, a side boss 523 is set near side of the second eccentric column 524, the side boss 523 is provided to be wedged into the first notch 43 correspondingly.

The first clamping block 6, which is placed in the second groove 125, a second spring retention groove 61 is set on a front side of the first clamping block 6, a second spring S2 is placed in the second spring retention groove 61, a second ball limit slot 62 is set on side of the first clamping block 6 for clamping an entered second ball C2, a second notch 63 is set on a rear side of the first clamping block 6 for limiting the second eccentric column 524 of the drive rod 52.

The second clamping block 7, which is placed inside the first groove 124, a third spring retention groove 71 is set on a front side of the second clamping block 7, a third spring S3 is placed in the third spring retention groove 71, two first ball limit slots 72 are set on a top of the second clamping block 7 for clamping the entered first balls C1, a third notch 73 is set on a rear side of the second clamping block 7 for limiting the first eccentric column 522 of the drive rod 52.

The external locking element B, a fixed head B1 is fixed on a hold down groove A4 of the body 1, the fixed head B1 is connected to an end of a flexible body B0 (the flexible body B0 is a steel rope or a chain), a latch B2 is connected to another end of the flexible body B0 for inserting into the latch inserting hole A5 of the body 1.

The external connecting element 3, which is correspondingly connected to the connecting portion 112 of the body 1, two limiting grooves 32 are set on, and two wedging portions 31 are respectively set on two sides to clamp into the clamping slot 114 of the connecting portion 112 correspondingly.

By the composition of the above structure, during locking operation (please refer to FIG. 3, FIG. 4, FIG. 5, FIG. 7), a quick release handle 92 connected to a seat tube 91 of a seat of a bicycle 9 is set surrounded by the body 1 and the fit seat 2, the first side bolt 221 and the second side bolt 231 are respectively inserted into the first inserting hole A2 and a second inserting hole A3 simultaneously. Since the first engaging teeth set 222 and the second engaging teeth set 232 are one-way helical tooth, the first engaging teeth set 222 may be one-way engaged by the first inner teeth set 42 with pushing inside, the second engaging teeth set 232 may be one-way engaged by the second inner teeth set 45 and pushed to a location that the first limiting hole edge 111 and the second limiting hole edge 21 are completely aligned, at this time, the quick release handle 92 is surrounded by the body 1 and the fit seat 2. And then, the wedging portion 31 of the external connecting element 3 is used to wedged into the clamping slot 114 of the connecting portion 112, the flexible body B0 of the external locking element B is used to wear around a wheel 93 (such as a front wheel and a rear wheel) of the bicycle 9, the latch B2 of the external locking element B is used to inserted into the latch inserting hole A5 of the body 1, the second ball C2 enters into a clamping slot B21 of the latch B2 to lock, the first clamping block 6 is not clamped by the second ball C2, at this time, the second spring S2 pushes the first clamping block 6 moving by its restored elasticity, the drive rod 52 is driven that the side boss 523 is correspondingly clamped into the first notch 43 to limit the push rod 4 moving, so that the body 1 and the fit seat 2 is in locking mode, the second clamping block 7 is driven by the first eccentric column 522 of the drive rod 52, so that the first ball limit slot 72 let the first ball C1 be clamped into the limiting groove 32 of the external connecting element 3 to lock. Finally, the key K is pulled out from the key inserting hole, and the locking operation is complete. Whereby, a thief cannot remove the quick release handle 92, so that the seat is prevented from being stolen. The external locking element B may be worn surrounded the wheel 93 of the bicycle 9 (such as a front wheel or a rear wheel) or other objects within the bicycle, or used to lock the whole bicycle 9 on a stopping column to prevent from being stolen.

Figure 7:
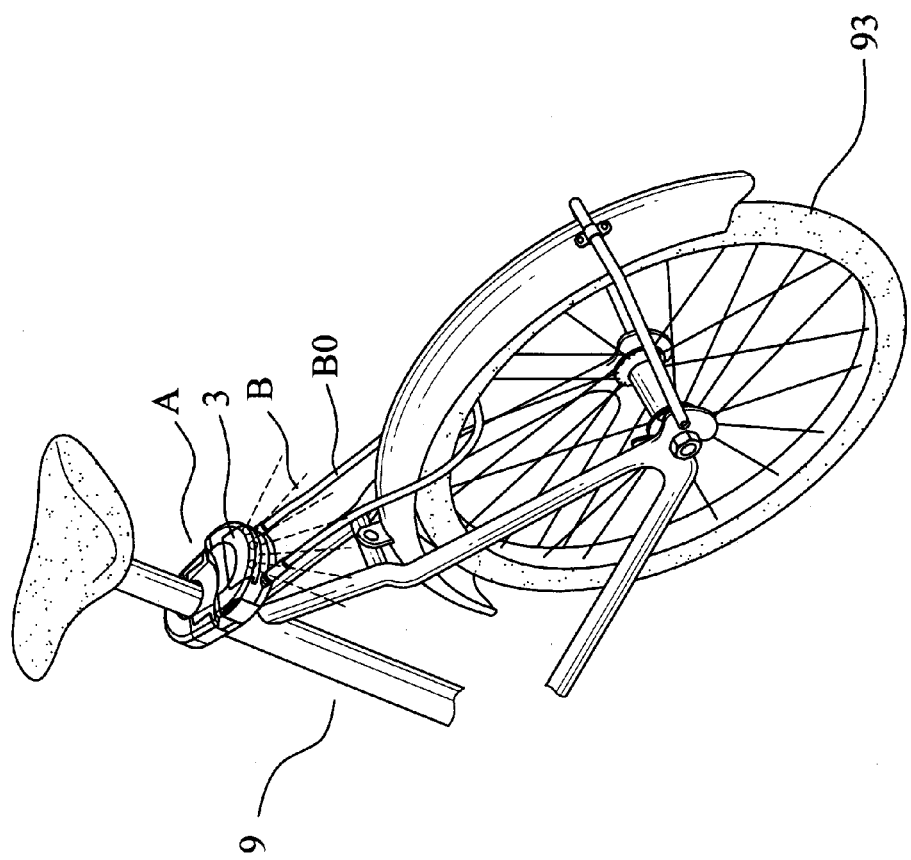
FIG. 7 is a three-dimensional schematic diagram (1) of the embodiment of the present invention.
Figure 8:
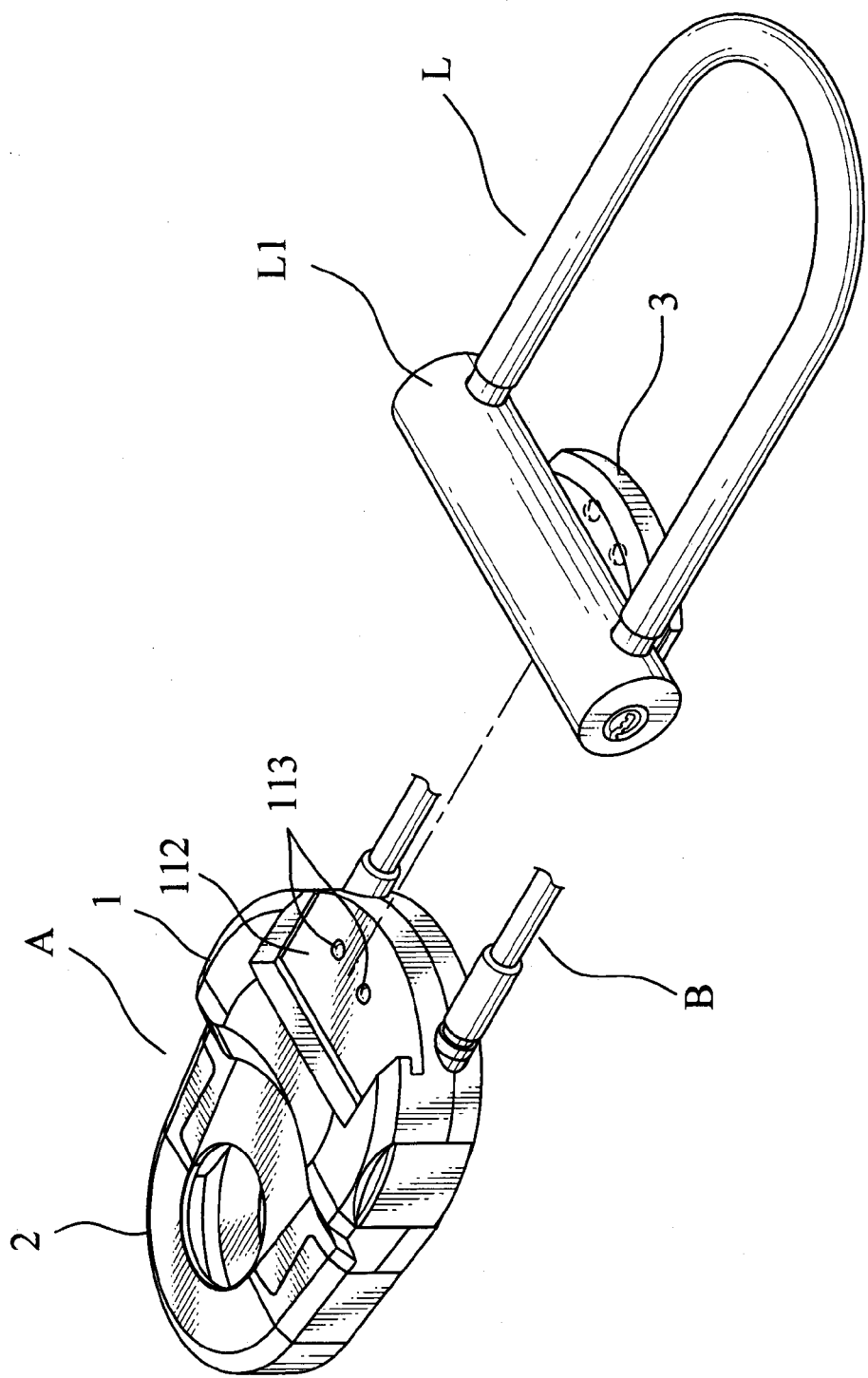
FIG. 8 is a three-dimensional schematic diagram of connecting the present invention and a U-lock.
Figure 9:
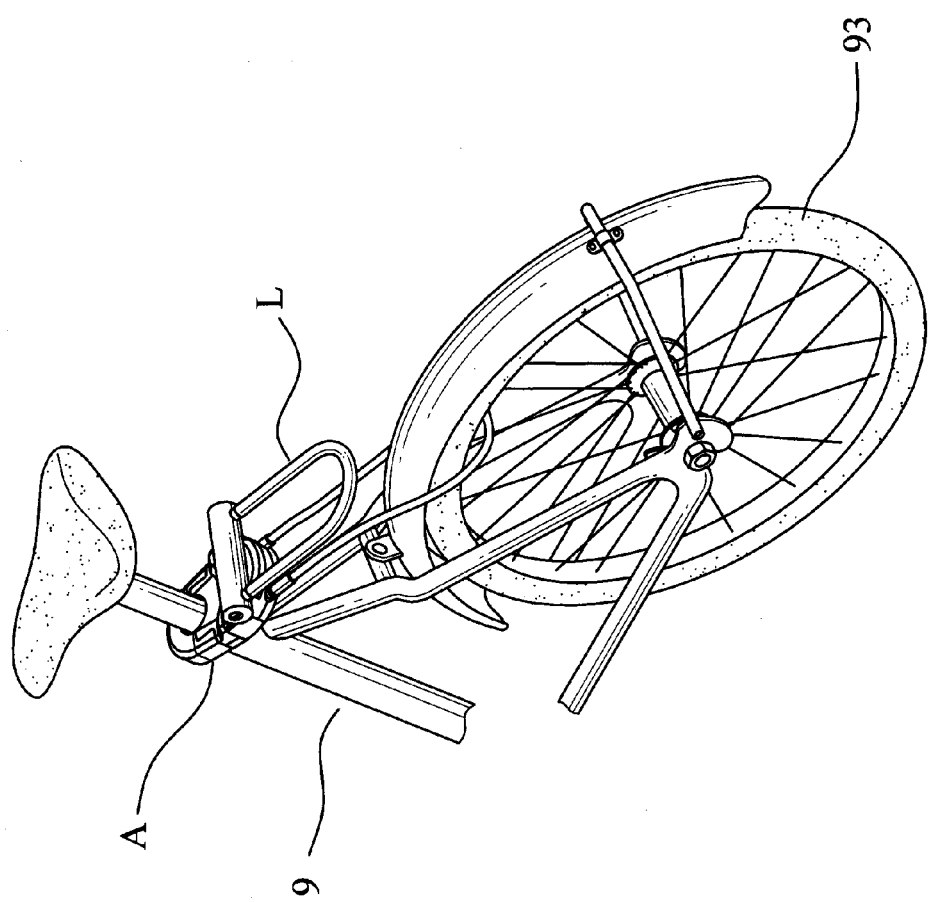
FIG. 9 is a three-dimensional schematic diagram (2) of the embodiment of the present invention.

Besides, the external connecting element 3 may be bicycle accessories, such as a fender or a warning lamp holder. For example, the external connecting element 3 is a warning lamp holder (as shown in FIG. 7), which may be connected to the connecting portion 112 of the bicycle lock A to generate warning effect. Further, the external connecting element 3 may also be a portion of a lock body L1 of a U-lock (as shown in FIG. 8, 9), it may be fixed to the connecting portion 112 of the bicycle lock A of the present invention to provide storage and placement of the U-lock.

Figure 10:
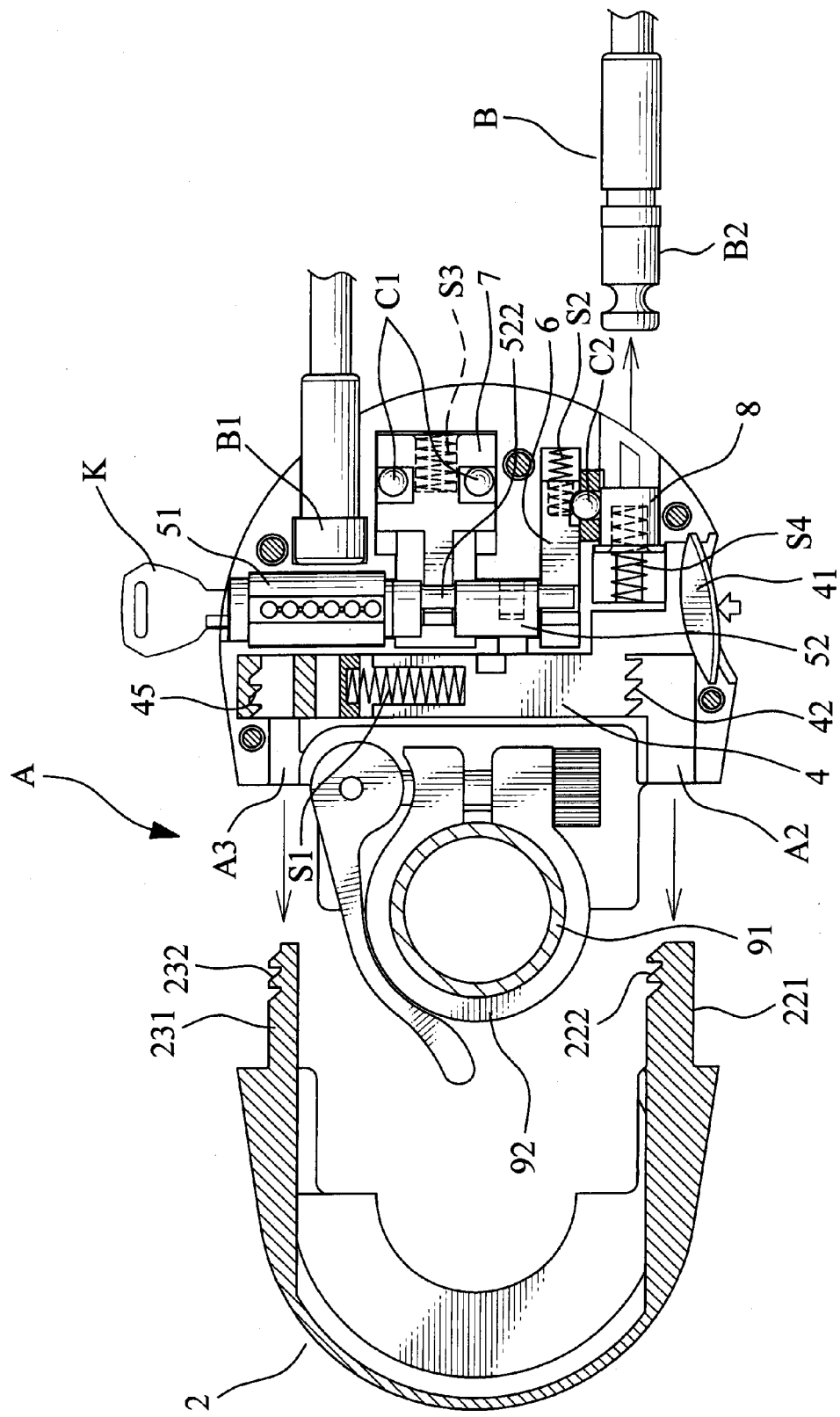
FIG. 10 is a schematic diagram of unlocking operation of the present invention.

As shown in FIG. 10, during unlocking operation, inserting the key K into the key inserting hole, and rotating the lock cylinder 51 to an unlocking position to drive the drive rod 52 so that the side boss 523 exiting the first notch 43 and the push rod 4 is not limited. At this time, the push rod 4 is pushed to move by stored elasticity of the first spring S1, the first engaging teeth set 222 is not engaged with the first inner teeth set 42, the second engaging teeth set 232 is not engaged with the second inner teeth set 45, the fit seat 2 may be pulled out from the first inserting hole A2 and the second inserting hole A3 of the body 1. Simultaneously, the second eccentric column 524 of the drive rod 52 driven by the first clamping block 6 moves outwards, so that the second ball C2 enters into the second ball limit slot 62 and is not engaged by the clamping groove B21 of the latch B2, the latch B2 pops up from the latch inserting hole A5. The second clamping block 7 driven by the first eccentric column 522 of the drive rod 52 moves, the first ball C1 enters into the first ball limit slot 72 and is not engaged by the limiting groove 32 of the external connecting element 3, so that it may removes from the connecting portion 112, and the unlocking operation is completed.

What is claimed is:

1. A bicycle lock for multiple connection uses, which includes at least a body, a fit seat, a push rod, a lock cylinder module, a first clamping block, an external locking element, wherein: the body, which is consisted of an upper housing and a lower housing, a first inserting hole and a second inserting hole are respectively set on an inner side of the body, a latch inserting hole is set on an outer side of the body, and a push rod groove, a lock cylinder groove, a second groove and a hold down groove are set inside the body; the fit seat, which is correspondingly locked to the body, a first side arm and a second side arm are respectively set on two sides of the fit seat, a first side bolt is extended from the first side arm for inserting the first inserting hole, a first engaging teeth set is set on the first side bolt, a second side bolt is extended from the second side arm for inserting the second inserting hole, a second engaging teeth set is set on the second side bolt; the push rod, which is placed inside the push rod groove, a pressing portion is set on a side of the push rod, a first inner teeth set is set on an inner side of the pressing portion for engaging with the first engaging teeth set, a first notch and a first spring retention groove are set in a middle section of the push rod, the first spring retention groove is provided for placing a first spring inside, a second inner teeth set is set on another side of the push rod for engaging with the second engaging teeth set; the lock cylinder module, which is placed inside the lock cylinder groove, the cylinder module includes a lock cylinder and a drive rod, a key inserting hole is set on a side of the lock cylinder, a lock bolt is set on a front end of the lock cylinder, a fit groove is set on a rear end of the drive rod for fitting with the lock bolt, a second eccentric column is set on a front end of the drive rod, a side boss is set near side of the second eccentric column, the side boss is provided to be wedged into the first notch correspondingly; the first clamping block, which is placed in the second groove, a second spring retention groove is set on a front side of the first clamping block, a second spring is placed in the second spring retention groove, a second ball limit slot is set on side of the first clamping block for clamping an entered second ball, a second notch is set on a rear side of the first clamping block for limiting the second eccentric column of the drive rod; the external locking element including a fixed head that is fixed on the body, the fixed head is connected to an end of a flexible body, a latch is connected to another end of the flexible body for inserting into the latch inserting hole of the body.

2. The bicycle lock for multiple connection uses as claimed in claim 1, wherein a pushing block is placed inside the latch inserting hole, a fourth spring retention groove is set on an inner side of the pushing block for placing a fourth spring to push.

3. The bicycle lock for multiple connection uses as claimed in claim 1, wherein a first limiting hole edge is set on an inner side of the upper housing, a second limiting hole edge is set on an inner side of the fit seat, a limiting hole is formed by combining the second limiting hole edge and the first limiting hole edge.

4. The bicycle lock for multiple connection uses as claimed in claim 1, wherein a connecting portion is set on an outer side of the upper housing, two clamping slots are respectively set on two sides of the connecting portion for a wedging portion of an external connecting element correspondingly wedged into the clamping slot.

5. The bicycle lock for multiple connection uses, which includes at least a body, a fit seat, a push rod, a lock cylinder module, a first clamping block, a second clamping block, an external locking element and an external connecting element, wherein: the body, which is consisted of an upper housing and a lower housing, a first inserting hole and a second inserting hole are respectively set on an inner side of the body, a latch inserting hole is set on an outer side of the body, a connecting portion is set on an outer side of the upper housing, and a push rod groove, a lock cylinder groove, a first groove, a second groove and a hold down groove are set inside the body; the fit seat, which is correspondingly locked to the body, a first side arm and a second side arm are respectively set on two sides of the fit seat, a first side bolt is extended from the first side arm for inserting the first inserting hole, a first engaging teeth set is set on the first side bolt, a second side bolt is extended from the second side arm for inserting the second inserting hole, a second engaging teeth set is set on the second side bolt; the push rod, which is placed inside the push rod groove, a pressing portion is set on a side of the push rod, a first inner teeth set is set on an inner side of the pressing portion for engaging with the first engaging teeth set, a first notch and a first spring retention groove are set in a middle section of the push rod, the first spring retention groove is provided for placing a first spring inside, a second inner teeth set is set on another side of the push rod for engaging with the second engaging teeth set; the lock cylinder module, which is placed inside the lock cylinder groove, the cylinder module includes a lock cylinder and a drive rod, a key inserting hole is set on a side of the lock cylinder, a lock bolt is set on a 5 front end of the lock cylinder, a fit groove is set on a rear end of the drive rod for fitting with the lock bolt, a first eccentric column is set in a middle section of the drive rod, a second eccentric column is set on a front end of the drive rod, a side boss is set near side of the second eccentric column, the side boss is provided to be wedged into the first notch correspondingly; the first clamping block, which is placed in the second groove, a second spring retention groove is set on a front side of the first clamping block, a second spring is placed in the second spring retention groove, a second ball limit slot is set on side of the first clamping block for clamping an entered second ball, a second notch is set on a rear side of the first clamping block for limiting the second eccentric column of the drive rod; the second clamping block, which is placed inside the first groove, a third spring retention groove is set on a front side of the second clamping block, a third spring is placed in the third spring retention groove, two first ball limit slots are set on a top of the second clamping block for clamping the entered first balls, a third notch is set on a rear side of the second clamping block for limiting the first eccentric column of the drive rod; the external locking element including a fixed head that is fixed on the body, the fixed head is connected to an end of a flexible body, a latch is connected to another end of the flexible body for inserting into the latch inserting hole of the body; the external connecting element, which is correspondingly connected to the connecting portion of the body.

6. The bicycle lock for multiple connection uses as claimed in claim 5, wherein a pushing block is placed inside the latch inserting hole, a fourth spring retention groove is set on an inner side of the pushing block for placing a fourth spring to push.

7. The bicycle lock for multiple connection uses as claimed in claim 5, wherein a first limiting hole edge is set on an inner side of the upper housing, a second limiting hole edge is set on an inner side of the fit sear, a limiting hole is formed by combining the second limiting hole edge and the first limiting hole edge.

8. The bicycle lock for multiple connection uses as claimed in claim 5, wherein two through holes are set on the connecting portion for two corresponding first balls entering and being clamped into two limiting grooves of the external connecting element.

9. The bicycle lock for multiple connection uses as claimed in claim 5, wherein two clamping slots are respectively set on two sides of the connecting portion, for a wedging portion of an external connecting element correspondingly wedged into the clamping slot.

* * * * *